United States Patent
Aikawa et al.

(10) Patent No.: US 11,335,936 B2
(45) Date of Patent: May 17, 2022

(54) CERAMIC SHEET AND METHOD FOR MANUFACTURING THE SAME

(71) Applicant: Nippon Shokubai Co., Ltd., Osaka (JP)

(72) Inventors: Norikazu Aikawa, Himeji (JP);
Katsuhiko Sakamoto, Suita (JP);
Kazuhisa Murakami, Himeji (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 16/712,285

(22) Filed: Dec. 12, 2019

(65) Prior Publication Data

US 2020/0203748 A1    Jun. 25, 2020

(30) Foreign Application Priority Data

Dec. 20, 2018 (JP) .............................. JP2018-238663
Oct. 31, 2019 (JP) .............................. JP2019-199169

(51) Int. Cl.
*H01M 8/1246* (2016.01)
*C04B 35/486* (2006.01)
(Continued)

(52) U.S. Cl.
CPC .......... *H01M 8/1246* (2013.01); *C04B 35/486* (2013.01); *C04B 35/6365* (2013.01); *C04B 35/63424* (2013.01); *C04B 35/64* (2013.01); *C04B 2235/3224* (2013.01); *C04B 2235/3229* (2013.01); *C04B 2235/3246* (2013.01);
(Continued)

(58) Field of Classification Search
CPC ....... H01M 8/1246; H01M 2008/1293; H01M 2300/0077; H01M 8/12; H01M 8/1253; C04B 35/486; C04B 35/63424; C04B 35/6365; C04B 35/64; C04B 2235/3224; C04B 2235/3229; C04B 2235/3246; C04B 2235/6025; C04B 2235/656; C04B 2235/5445; C04B 2235/963;
(Continued)

(56) References Cited

U.S. PATENT DOCUMENTS

| | | | | |
|---|---|---|---|---|
| 7,294,164 B2 * | 11/2007 | Merkel | ................... | F01N 3/022 55/523 |
| 7,914,874 B2 * | 3/2011 | Henry | ................... | C04B 35/565 428/116 |
| 10,797,207 B2 * | 10/2020 | Estrada | ................... | H01L 33/44 |

(Continued)

FOREIGN PATENT DOCUMENTS

| | | | | |
|---|---|---|---|---|
| DE | 112014004447 T5 * | 6/2016 | .......... | H01M 8/0245 |
| EP | 1063212 A1 | 12/2000 | | |

(Continued)

OTHER PUBLICATIONS

Extended European Search Report issued in counterpart European Patent Application No. 19214482.2 dated May 12, 2020.

*Primary Examiner* — Nathan L Van Sell
(74) *Attorney, Agent, or Firm* — Morgan, Lewis & Bockius LLP

(57) ABSTRACT

A ceramic sheet including a principal surface having particle marks is disclosed. The average width of the particle marks is 0.2 to 50 μm, the average depth of the particle marks along the sheet thickness direction is 0.1 to 25 μm, and the coefficient of variation of the widths of the particle marks is 0.23 or more.

13 Claims, 8 Drawing Sheets

(51) Int. Cl.
    *C04B 35/634* (2006.01)
    *C04B 35/636* (2006.01)
    *C04B 35/64* (2006.01)
    *H01M 8/124* (2016.01)
    *H01M 8/12* (2016.01)

(52) U.S. Cl.
    CPC .......... *C04B 2235/6025* (2013.01); *C04B 2235/656* (2013.01); *H01M 2008/1293* (2013.01)

(58) Field of Classification Search
    CPC ............ C04B 35/638; C04B 35/62218; Y02E 60/50; Y02P 70/50
    See application file for complete search history.

(56) References Cited

U.S. PATENT DOCUMENTS

| | | | | |
|---|---|---|---|---|
| 2008/0226893 | A1* | 9/2008 | Yang | A61L 27/10 428/312.2 |
| 2009/0057939 | A1* | 3/2009 | Henry | C04B 35/195 264/43 |
| 2011/0120853 | A1* | 5/2011 | Chun | C10G 9/16 201/18 |
| 2013/0331256 | A1* | 12/2013 | Mueller-Zell | C04B 33/24 501/153 |
| 2020/0035870 | A1* | 1/2020 | Estrada | H01L 33/64 |

FOREIGN PATENT DOCUMENTS

| | | |
|---|---|---|
| EP | 1892787 A2 | 2/2008 |
| EP | 2413408 A1 | 2/2012 |
| JP | H03-060469 A | 3/1991 |
| JP | 2011034819 A * | 2/2011 |
| JP | 4729121 B2 | 7/2011 |
| JP | 2015-069694 A | 4/2015 |
| JP | 2019-064218 A | 4/2019 |
| JP | 2019-064219 A | 4/2019 |
| JP | 2019-064220 A | 4/2019 |

* cited by examiner

CERAMIC SHEET AND METHOD FOR MANUFACTURING THE SAME

CROSS REFERENCE TO RELATED APPLICATION

This application claims the priority benefit of Japanese Applications No. JP2018-238663 filed on Dec. 20, 2018 and JP2019-199169 filed on Oct. 31, 2019, the entire contents of which are incorporated herein by references.

TECHNICAL FIELD

The present disclosure relates to a ceramic sheet and a method for manufacturing the same.

BACKGROUND

Since ceramics are excellent in electric and magnetic characteristics, further biocompatibility and the like in addition to heat resistance and mechanical properties such as abrasion resistance, ceramics are widely utilized in many fields. Since especially zirconia-based ceramics have excellent oxygen ion conductivity, the ceramics can be effectively utilized as solid electrolytes of solid oxide fuel cells.

As a method for manufacturing a ceramic sheet, a commonly implemented method is, for example, as follows. The method is a method in which a raw material slurry containing ceramic raw material powder and a binder is first formed into a sheet shape by a doctor blade method or the like, the sheet-shaped formed article is then dried to obtain a long green sheet, this long green sheet is next cut to manufacture green sheets having a predetermined size, and these green sheets are fired.

When the green sheets are fired, a method for disposing a pile of a plurality of green sheets on a shelf plate (setter) and firing the green sheets in the state is generally used to use a furnace efficiently and shift to mass production with an electric power cost reduced.

When a plurality of green sheets in contact with each other is piled and fired in its state, the following problem occurs: after firing, the sheets cannot be separated with the sheets attached firmly or crack if it is attempted to separate the sheets occurs. Especially, in green sheets obtained by a method of using a resin film such as polyethylene terephthalate as a substrate film, coating the substrate film with a raw material slurry and forming a green sheet, surfaces which were in contact with the substrate films are smoothed. Therefore, especially when green sheets were piled through surfaces which were in contact with substrate films, the sheets after firing adhere firmly.

For example, a method for manufacturing a ceramic sheet, wherein inorganic powder is sprinkled and laid between green sheets as releasing powder so that green sheets are not in direct contact when the green sheets are piled is then disclosed in Japanese Unexamined Patent Publication No. H3-60469.

However, when inorganic powder as releasing powder is laid between green sheets like the conventional method described in Japanese Unexamined Patent Publication No. H3-60469, the sheets need to be washed one by one to remove the inorganic powder after firing. The attached powder generally needs to be removed mechanically and water-washed using ultrasonic waves or the like, the green sheets then need to be dried, and devices therefor must be provided. Therefore, such work is laborious, and is the main cause why ceramic sheets to be manufactured crack during the work to reduce the yield when the sheets are thin film sheets.

SUMMARY

Hereinafter, one or more embodiments of the present disclosure is disclosed.

[1] A ceramic sheet including: a principal surface having particle marks, wherein an average width of the particle marks is 0.2 to 50 µm, an average depth of the particle marks along the sheet thickness direction is 0.1 to 25 µm, and a coefficient of variation of the widths of the particle marks is 0.23 or more.

[2] The ceramic sheet according to [1], wherein an inside of a first particle mark in the particle marks is a curved surface, and a depression and a projection are provided on at least a part of an inside of a second particle mark in the particle marks.

[3] The ceramic sheet according to [1] or [2], wherein a maximum width of at least one particle mark in the particle marks is located closer to a bottom side thereof than to the principal surface in the sheet thickness direction.

[4] The ceramic sheet according to any one of [1] to [3], wherein some of the particle marks overlap with each other or are in contact with each other.

[5] The ceramic sheet according to any one of [1] to [4], wherein a coefficient of variation of depths of the particle marks is 0.25 or more.

[6] The ceramic sheet according to any one of [1] to [5], wherein depths of some particle marks in the particle marks are 0.05 to 0.4 µm, and depths of some other particle marks in the particle marks are 0.8 to 6 µm.

[7] A method for manufacturing a ceramic sheet, including: attaching organic particles having an average particle size of 0.1 to 50 µm to at least one surface of a green sheet; providing the green sheets to which the organic particles are attached, and piling the green sheets directly to form a stacked body; and firing the green sheets in a state of the stacked body.

[8] A method for manufacturing a ceramic sheet, including: attaching particles having an average particle size of 0.1 to 50 µm to one surface of a substrate film; coating the surface to which the particles are attached with a raw material slurry to obtain a coating film on the surface, and drying and exfoliating the coating film to obtain a green sheet, the raw material slurry including a ceramic raw material powder and a binder; providing the green sheets and piling the green sheets directly to form a stacked body; and firing the green sheets in a state of the stacked body.

[9] A method for manufacturing a ceramic sheet according to [7] or [8], wherein a shape of organic particles or particles is spherical.

According to the present disclosure, a method for manufacturing a ceramic sheet, wherein the manufacturing process can be simplified, the cost can be reduced, and a ceramic sheet has enough flexural strength can be obtained, and a ceramic sheet which can be manufactured by the manufacturing method can be provided.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION

Although one embodiment of the present disclosure will be described in detail hereinafter, the present disclosure is not limited to this. An embodiment according to one aspect of the present disclosure will be described in detail with reference to the attached figures hereinafter. In the following description, the same sign is used for the same components or components having the same function, and the same descriptions are omitted.

<Method for Manufacturing Ceramic Sheet of First Embodiment>

A method for manufacturing a ceramic sheet of a first embodiment includes: a step of attaching organic particles having an average particle size of 0.1 to 50 μm to at least one surface of a green sheet; a step of providing a plurality of the green sheets, the organic particles attached to the green sheets, and piling the plurality of the green sheets directly to form a stacked body; and a step of firing the green sheets in the state of the stacked body.

According to such a manufacturing method, particle marks derived from organic particles are formed on at least one surface of a green sheet. Therefore, even though firing is performed in the state of a stacked body obtained by piling a plurality of green sheets directly, the sheets can be separated comparatively easily after firing. The organic particles are burned down when the green sheets are fired, and thus time and effort can be saved to remove the particles after firing. Additionally, in the manufacturing method of the present embodiment, very simple treatment of attaching organic particles to green sheets is merely performed, and the characteristics of ceramic sheets obtained by this treatment does not change greatly. Therefore, the manufacturing method of the present embodiment can achieve the simplification of the manufacturing process and reduction in cost, and the ceramic sheets according to the present embodiment can have the characteristics which are not so much different from that of ceramic sheets obtained by the conventional manufacturing method.

A method for manufacturing a ceramic sheet of a first embodiment will be described in detail hereinafter.

(Provision of Green Sheets)

Green sheets are provided in this step. Green sheets to be provided are not particularly limited, and green sheets obtained, for example, by the following method can be used. That is, a green sheet can be obtained by coating one surface of a substrate film with a raw material slurry containing ceramic raw material powder and a binder, and drying and exfoliating the obtained coating film.

Figure 1:
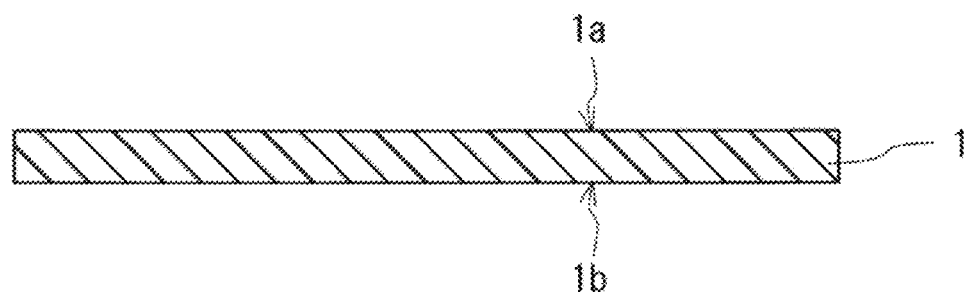
FIG. 1 is a schematic cross section showing one aspect of a green sheet.

FIG. 1 is a schematic cross section showing one aspect of the green sheet obtained by the above-mentioned method. A green sheet 1 in FIG. 1 has a first surface 1a which was in contact with a substrate film and a second surface 1b on the opposite side to the surface which was in contact with the substrate film. The first surface 1a which was in contact with the substrate film is a smoother surface than the second surface 1b on the side opposite thereto among these surfaces.

A raw material slurry can be prepared, for example, by mixing ceramic raw material powder and a binder with a solvent.

The raw material slurry can be applied to the substrate film by a usual method, for example, a doctor blade method, an extrusion method, a calendar roll method or the like.

As the substrate film, for example, a resin film such as a polyethylene terephthalate (PET) film can be used. When a long substrate film is used, a long green sheet can also be obtained. The long green sheet may be cut to a predetermined size and then presented to the next step, and the long green sheet may be presented to the next step without cutting the long green sheet and then cut to a predetermined size.

The size and thickness of a green sheet can be determined in view of the size and the thickness of a ceramic sheet to be manufactured and the shrinkage factor by firing. The size and the thickness of the green sheet used in the manufacturing method of the present embodiment may be determined, for example, so that the finally obtained ceramic sheet has an area of 5 to 200 $cm^2$ and a thickness of 50 to 300 μm.

The ceramic raw material powder can be optionally selected depending on the ceramic sheet to be manufactured. For example, various ceramics such as zirconia, alumina, ceria, titania, silica, mullite, cordierite, spinel, forsterite, anorthite, celsian, enstatite, aluminum nitride and silicon nitride can be used.

When the ceramic sheet to be manufactured is an electrolyte sheet used, for example as a solid electrolyte of a solid oxide fuel cell (hereafter described as "SOFC"), raw materials of solid electrolyte materials constituting an electrolyte sheet are used for the ceramic raw material powder. In this case, for example, a zirconia-based ceramic may be used as a raw material. Specific examples include zirconia containing at least any one selected from alkaline-earth metal oxides such as MgO, CaO, SrO and BaO; rare earth element oxides such as $Sc_2O_3$, $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $HO_2O_3$, $Er_2O_3$, and $Yb_2O_3$; oxides such as $Bi_2O_3$ and $In_2O_3$ as a stabilizer. Additionally, any oxide selected from $SiO_2$, $Ge_2O_3$, $B_2O_3$, $SnO_2$, $Ta_2O_5$ and $Nb_2O_5$ may be contained as another additive. Stabilized zirconia containing at least any one rare earth element selected from the group consisting of scandium, yttrium, cerium, gadolinium and ytterbium at a rate of 8 to 15 mol % in the total amount in terms of oxide may be used from the viewpoint that high-level oxygen ion conductivity, strength and toughness are secured.

Besides, a ceria-based or bismuth-based oxide obtained by adding at least any one selected from CaO, SrO, BaO, $Y_2O_3$, $La_2O_3$, $Ce_2O_3$, $Pr_2O_3$, $Nd_2O_3$, $Sm_2O_3$, $Eu_2O_3$, $Gd_2O_3$, $Tb_2O_3$, $Dr_2O_3$, $HO_2O_3$, $Er_2O_3$, $Yb_2O_3$, PbO, $WO_3$, $MoO_3$, $V_2O_5$, $Ta_2O_5$, $Nb_2O_5$ and the like to $CeO_2$ or $Bi_2O_3$ can also be used as a raw material of the solid electrolyte materials. A gallate-based oxide such as $LaGaO_3$ can also be used.

The type of binder used for manufacturing green sheets is not limited, and the binder can be optionally selected from well-known organic binders and inorganic binders in conventional methods for manufacturing ceramic sheets.

Examples of the organic binder include ethylene-based copolymers, styrene-based copolymers, acrylate-based and methacrylate-based copolymers, vinyl acetate-based copolymers, maleic acid-based copolymers, vinyl acetal-based resins, a vinyl formal resin, a polyvinyl butyral resin, vinyl alcohol-based resins, celluloses such as ethyl cellulose, and waxes. Among these, the organic binder may be acrylate-based and methacrylate-based copolymers having a number average molecular weight of 20000 to 200000, or 50000 to 100000 and obtained by polymerizing or copolymerizing at least one selected from alkyl acrylates such as methyl acrylate, ethyl acrylate, propyl acrylate, butyl acrylate, isobutyl acrylate, cyclohexyl acrylate and 2-ethylhexyl acrylate having an alkyl group with 10 or less carbon atoms; alkyl methacrylates such as methyl methacrylate, ethyl methacrylate, propyl methacrylate, butyl methacrylate, isobutyl methacrylate, cyclohexyl methacrylate, 2-ethylhexyl methacrylate, dodecyl methacrylate and lauryl methacrylate having an alkyl group with 20 or less carbon atoms; hydroxyalkyl acrylates or hydroxyalkyl methacrylates such as hydroxyethyl acrylate, hydroxypropyl acrylate, hydroxyethyl methacrylate and hydroxypropyl methacrylate having a hydroxyalkyl group; aminoalkyl acrylates or aminoalkyl methacrylates such as dimethylaminoethyl acrylate and dimethylaminoethyl methacrylate; carboxyl group-containing monomers such as acrylic acid, methacrylic acid, maleic acid, maleic acid half ester such as monoisopropyl maleate; and the like from the viewpoints of the formability and/or strength of green sheets, and thermal decomposability at the time of extensive firing for mass production. The lower limit of the number average molecular weight of the copolymer may be 20000 or 50000, and the upper limit thereof may be 200000 or 100000. These organic binders can be used alone or optionally in combination of two or more if needed. The organic binder may be a copolymer of a monomer containing isobutyl methacrylate and/or 2-ethylhexyl methacrylate at 60% by mass or more.

As the inorganic binder, at least any one selected from, for example, a zirconia sol, a silica sol, an alumina sol, a titania sol and the like can be used.

The mass ratio of the ceramic raw material powder to the binder in the raw material slurry is not particularly limited. For example, the binder may be 5 to 30 parts by mass, or may be 10 to 20 parts by mass based on 100 parts by mass of the ceramic raw material powder. The binder amount can be optionally selected in view of the particle size of the raw material powder, the strength, flexibility and the like required for a ceramic sheet to be manufactured.

The type of the solvent used for the raw material slurry is not particularly limited, and can be optionally selected from well-known solvents in conventional methods for manufacturing ceramic sheets. Solvents optionally selected from, for example, water; alcohols such as ethanol, 2-propanol, 1-butanol, and 1-hexanol; ketones such as acetone and 2-butanone; aliphatic hydrocarbons such as pentane, hexane and heptane; aromatic hydrocarbons such as benzene, toluene, xylene and ethyl benzene; and acetic acid esters such as methyl acetate, ethyl acetate and butyl acetate may be used alone or as a mixture of two or more optionally. The amount of the solvent used may be optionally adjusted in view of the viscosity of the raw material slurry at the time of forming green sheets. For example, the slurry viscosity may be adjusted to the range of 1 to 20 Pa·s (10 to 200 poises) or 1 to 5 Pa·s (10 to 50 poises).

A dispersant, a plasticizer, a lubricant, a surfactant, an antifoaming agent and/or the like may further be added to the raw material slurry if needed. For example, the dispersant is added to promote the peptization and/or dispersion of the ceramic raw material powder. Examples of the dispersant include polymer electrolytes such as polyacrylic acid and polyacrylic acid ammonium; organic acids such as citric acid and tartaric acid; a copolymer of isobutylene or styrene and maleic anhydride and an ammonium salt thereof or an amine salt thereof; and a copolymer of butadiene and maleic anhydride and an ammonium salt thereof. For example, the plasticizer is added to impart flexibility to green sheets. Examples of the plasticizer include phthalic acid esters such as dibutyl phthalate and dioctyl phthalate; phthalic acid polyesters; glycols such as propylene glycol; and glycol ethers.

(Attachment of Organic Particles)

In this step, organic particles are attached to at least one surface of a green sheet. The surface of the green sheet to which the organic particles are attached may be a first surface, may be a second surface, or may be both surfaces. The organic particles may be attached to the first smoother surface among these from the viewpoint that ceramic sheets after firing are easily separated. The organic particles are attached to at least one surface of the green sheet in the present embodiment so that particle marks remain.

Examples of a method for attaching the organic particles to the green sheet so that particle marks remain include, but are not particularly limited to, a method for mixing organic particles with a binder and a solvent to prepare a shiny and applying (printing) this to a green sheet; a method for disposing organic particles on a green sheet and then pressing and pushing the organic particles into the green sheet using a press sheet or the like; a method for moistening the surface of a green sheet with a solvent or the like and sprinkling organic powder on the green sheet; and a method for sprinkling organic powder dispersed in a solvent on the surface of a green sheet with a spray or the like.

As the method for applying a slurry on a green sheet, a usual method such as screen printing, a slot die coater, a lip coater, a gravure coater can be applied.

Examples of the binder used for a slurry include, but are not particularly limited to, cellulose-based resins, epoxy-based resins, acrylic resins and a butyral resin. Ethyl cellulose or a butyral resin may be used among these. Examples of the solvent used for a slurry include, but are not particularly limited to, α-terpineol, diethylene glycol monobutyl ether acetate (butyl Carbitol acetate), diethylene glycol monobutyl ether (butyl Carbitol) and isobornyl acetate. In addition, a dispersant, a leveling agent, a viscosity modifier or the like may be added to the slurry.

Although the material of the organic particles is not particularly limited, organic particles which exhibit high hardness may be used from the viewpoint that particle marks can be left on the green sheet more efficiently. Specific examples of the organic particles include a poly(meth)acrylate resin. As the poly(meth)acrylate resin, for example, EPOSTAR manufactured by NIPPON SHOKUBAI CO., LTD., MX-80H3wT manufactured by Soken Chemical & Engineering Co., Ltd. or the like can be used. These particles can be used alone or as a mixture of a plurality of types.

The average particle size of the organic particles is 0.1 to 50 μm. The obtained ceramic sheets can be separated comparatively easily after firing without reducing the flexural strength of the sheets by this. The lower limit of the average particle size of the organic particles may be 0.5 μm or more, 1 μm or more, or 1.5 μm or more. The upper limit of the average particle size of the organic particles may be 30 μm or less, 20 μm or less, or 10 μm or less. The average particle size of particles herein is a particle size which is calculated from the particle size distribution obtained by particle size distribution measurement by laser diffractometry and at which the volume accumulation is equivalent to 50% (d50). The average particle size of particles can be measured, for example, using a laser diffraction/scattering particle size distribution measuring apparatus LA-920 (manufactured by HORIBA, Ltd.).

The shape of the organic particles is not particularly limited, and the shape may be spherical. At least some of the organic particles attached to the green sheet may aggregate. That is, clusters constituted by a plurality of organic particles may be attached to at least one surface of the green sheet.

(Formation of Stacked Body)

In this step, a plurality of the green sheets to which organic particles were attached by the above-mentioned method are provided, and the plurality of these green sheets is directly piled to form a stacked body.

The directions of the green sheets at the time of piling the green sheets are not particularly limited, and the green sheets may be piled so that the surface to which the organic particles are attached and the surface to which organic particles are not attached are adjacent to each other. That is, when the surface to which organic particles are attached is a first surface, the green sheets may be piled so that the first surface is adjacent to a second surface. When the surface to which organic particles are attached is the second surface, the green sheets may be piled so that the second surface is adjacent to the first surface. Especially according to the manufacturing method of the present embodiment, even though the first smooth surface is not treated, ceramic sheets after firing can be easily separated by making the first surface adjacent to the second surface to which organic particles were attached.

Organic powder may be further sprinkled on green sheets, and the organic powder may be laid between the piled green sheets to prevent the adhesion of green sheets more highly. As the organic powder, for example, natural organic powders or synthetic organic resin powders such as sublimable resin powder such as melamine cyanurate can be used. Especially, starch powders such as flour, cornstarch, sweet potato starch, potato starch and tapioca starch may be used. The amount of the organic powder used is, for example, around 0.005 to 2 mg/cm$^2$ based on the area of the green sheet.

For example, a stacked body is disposed on a setter so that the first surfaces and the second surfaces of the green sheets meet are along the surface of the setter. The number of green sheets piled in a stacked body is not particularly limited, and the number is, for example, 2 to 40 sheets or 3 to 20 sheets. A well-known ceramic setter used at the time of manufacturing ceramic sheets can be used for the setter.

(Firing of Green Sheets)

In this step, the green sheets are fired in the state of a stacked body. Specific conditions of firing are not particularly limited, and a well-known method for firing green sheets can be used. That is, suitable temperature conditions and time conditions may be selected depending on raw materials used for the green sheet, and heating and firing may be performed so that sintered bodies having a target crystal structure are obtained. As an example, green sheets are first heat-treated at 150 to 600° C. or 250 to 500° C. for around 5 to 80 hours to remove organic components such as a binder and a solvent from the green sheets. Subsequently, the green sheets may be fired in the air atmosphere or a low oxygen concentration atmosphere at 1000 to 1800° C. or 1200 to 1600° C. for around 2 to 10 hours.

Ceramic sheets are obtained by separating ceramic sheets from a stacked body one by one after firing. According to the manufacturing method of the present embodiment, the stacked body can be divided into individual ceramic sheets without damaging the sheets.

<Method for Manufacturing Ceramic Sheet of Second Embodiment>

A method for manufacturing a ceramic sheet of a second embodiment includes: a step of attaching particles having an average particle size of 0.1 to 50 μm to one surface of a substrate film; a step of applying a raw material slurry containing ceramic raw material powder and a binder to the surface to which the particles were attached in the substrate film, and drying and exfoliating the obtained coating films to obtain green sheets; a step of providing the green sheets and piling the green sheets directly to form a stacked body; and a step of firing the green sheets in the state of the stacked body.

According to such a manufacturing method, particle marks derived from the particles attached to the substrate film are formed on the surface of the green sheets. For this reason, even if the green sheets are fired in the state of the stacked body into which the plurality of the green sheets are piled directly and formed, the green sheets can be separated comparatively easily after firing. In the manufacturing method of the present embodiment, very simple treatment of attaching particles to a substrate film is merely performed, and the characteristics of ceramic sheets obtained by this treatment does not change greatly, either. Therefore, the manufacturing method of the present embodiment can achieve the simplification of the manufacturing process and reduction in cost, and the ceramic sheets according to the present embodiment can have the characteristics which are not so much different from that of ceramic sheets obtained by the conventional manufacturing method.

The method for manufacturing a ceramic sheet of the second embodiment will be described in detail hereinafter.

(Attachment of Particles)

In this step, particles are attached to one surface of a substrate film. The particles may be inorganic particles, or may be organic particles. As the organic particles, organic particles having the above-mentioned average particle size of 0.1 to 50 μm can be used. As the inorganic particles, for example, alumina particles, silica particles, carbon particles or the like having an average particle size of 0.1 to 50 μm can be used. The shape of the particles is not particularly limited, and the shape is, for example, spherical. At least some of the particles on the substrate film may aggregate. That is, clusters constituted by a plurality of the particles may be attached to one surface of the substrate film. These particles can be used alone or as a mixture of a plurality of types.

Examples of a method for attaching particles to a substrate film include, but are not particularly limited to, a method for mixing particles with a binder and a solvent to prepare a slurry or a dilute suspension and applying (printing) this to a substrate film, a method for coating with this, and a method for sprinkling this. The binder and the solvent illustrated in Attachment of organic particles in the first embodiment, and the like can be used. In the manufacturing method of the present embodiment, particles do not need to be necessarily attached so that particle marks remain on a substrate film, and when a raw material slurry is applied in the following step, the attached particles may remain on the substrate film.

When organic particles are applied as the particles, the organic particles may remain on a substrate film, or may be transferred to a green sheet at the time of exfoliating a coating film in the following step. It is because even though the organic particles exist on the green sheet, the organic particles disappear at the time of firing, and time and effort to remove this are saved. Meanwhile, when inorganic particles are applied as the particles, the inorganic particles need to be attached to a substrate film so that the inorganic particles remain on the substrate film at the time of exfoliating a coat coating film in the following step.

(Manufacturing of Green Sheets)

In this step, a raw material slurry containing ceramic raw material powder and a binder is applied to a surface to which particles are attached to a substrate film, and the obtained coating film is dried and exfoliated to obtain a green sheet. In this step, the same method as Provision of green sheets in the first embodiment can be applied except that the raw material slurry is applied to the surface to which the particles are attached to the substrate film.

(Formation of Stacked Body)

In this step, a plurality of the green sheets manufactured by the above-mentioned method are provided, the plurality of those green sheets is piled directly to form a stacked body.

The direction of green sheets at the time of piling the green sheets is not particularly limited, and surfaces which were in contact with substrates may be adjacent, opposite surfaces to surfaces which were in contact with substrates may be adjacent, and a surface which was in contact with a substrate and an opposite surface to a surface which was in contact with a substrate may be adjacent. Among these, there may be an aspect in which all the green sheets are piled so that surfaces which were in contact with substrates and opposite surfaces to the surfaces which were in contact with substrates are adjacent, namely an aspect in which the green sheets are piled so that only either surfaces which were in contact with substrates or opposite surfaces to the surfaces which were in contact with the substrates are upper surfaces. As the other conditions, the same conditions as the above-mentioned Formation of stacked body of the first embodiment can be applied.

(Firing of Green Sheets)

In this step, green sheets are fired in the state of a stacked body. The conditions of firing can be the same conditions as Firing of green sheets of the first embodiment.

Ceramic sheets are separated from the stacked body after firing one by one, and thus the ceramic sheets can be obtained. According to the manufacturing method of the present embodiment, the stacked body can be divided into individual sheets without damaging ceramic sheets.

<Green Sheet>

A green sheet of the present embodiment has particle marks derived from particles (organic particles) having an average particle size of 0.1 to 50 μm on least one surface. The green sheet of the present embodiment may be a green sheet in which recesses having a width of 0.5 μm or more and 50 μm or less and a depth of 0.2 μm or more and 25 μm or less are formed on at least one surface. Such recesses may be formed on the whole green sheet, or may be formed in a part thereof.

These green sheets can be manufactured, for example, by the above-mentioned step of Attachment of organic particles in the first embodiment or Manufacturing of green sheets in the second embodiment. According to such green sheets, particle marks or recesses having a suitable size are formed, and thus even though the stacked body into which the green sheets are piled directly and formed is fired, the sheets can be separated comparatively easily after firing.

Figure 2A:
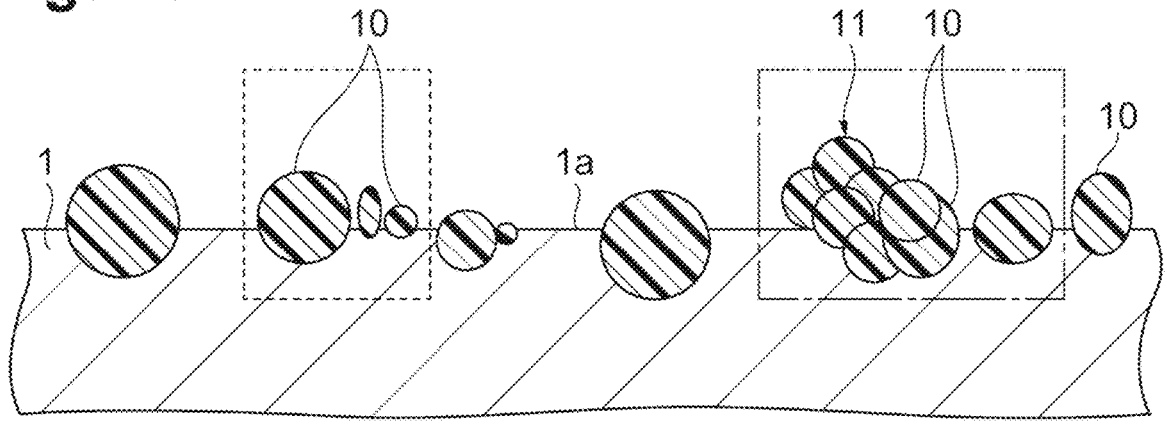
FIG. 2A is an outline enlarged end view showing a state in which organic particles are attached to a green sheet according to a first embodiment.
Figure 2B:
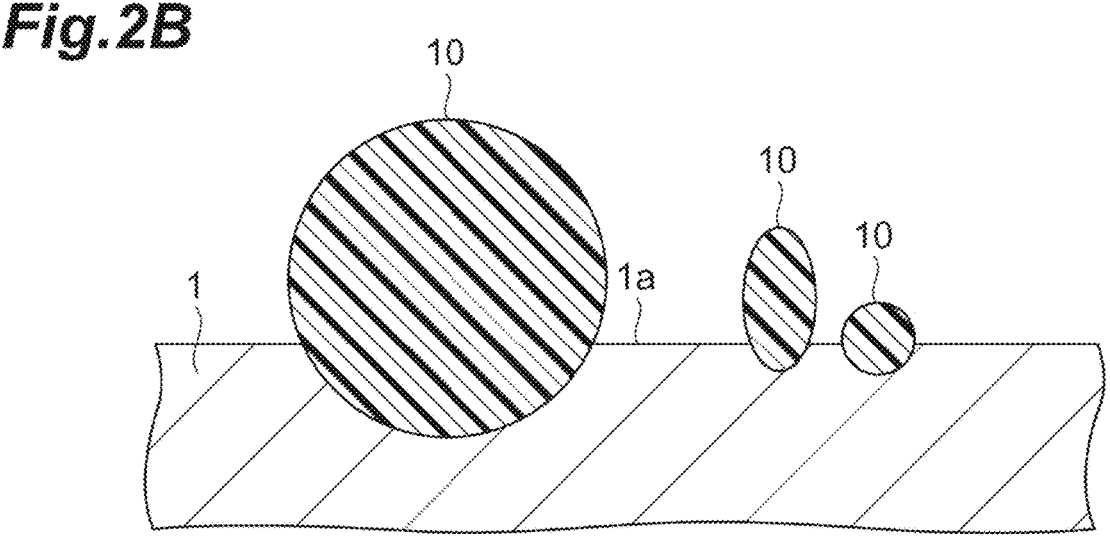
FIG. 2B is an enlarged view of a region shown with a dashed line in FIG. 2A.
Figure 2C:
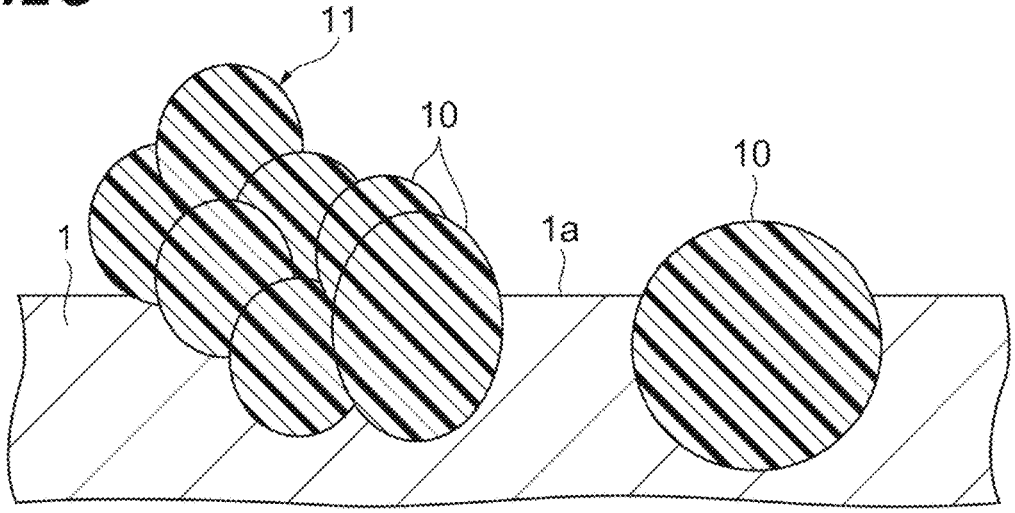
FIG. 2C is an enlarged view of a region shown with an alternate long and short dash line in FIG. 2A.

Next, an example of the construction of a green sheet manufactured by the manufacturing method in the first embodiment will be described with reference to FIGS. 2A to 2C. FIG. 2A is an outline enlarged end view showing a state in which organic particles is attached to a green sheet according to the first embodiment. FIG. 2B is an enlarged view of a region shown with a dashed line in FIG. 2A. FIG. 2C is an enlarged view of a region shown with an alternate long and short dash line in FIG. 2A. As shown in FIGS. 2A to 2C, a plurality of organic particles 10 are attached to a first surface 1a of a green sheet 1. The plurality of organic particles 10 are irregularly disposed on the first surface 1a. In the first embodiment, although a part of each organic particle 10 is embedded in the green sheet 1, it is not limited to this.

As shown in FIG. 2B, a plurality of organic particles 10 consists a single type, or is a mixture of a plurality of types. In any case, the plurality of organic particles 10 contain, for example, organic particles having a different size (particle size) from each other. The plurality of organic particles 10 can also contain organic particles having the same size (particle size) from each other (refer to FIG. 2A). The particle size of the smallest organic particle is, for example, 0.2 to 1 μm among the plurality of organic particles 10, and the particle sizes of the largest organic particle is, for example, 50 to 100 μm among the plurality of organic particles 10. The particle sizes of comparatively small organic particles are, for example, 2 to 5 μm among the plurality of organic particles 10, and the particle sizes of comparatively large organic particles are, for example, 10 to 15 μm among the plurality of organic particles 10. The average particle size of the plurality of organic particles 10 is as mentioned above. For example, the organic particles 10 are easily embedded in the green sheet 1 regardless of the masses of organic particles 10 by softening the first surface 1a of the green sheet 1 by dissolution or the like. The surface area of ceramic sheets described later can be improved satisfactorily thereby.

As shown in FIG. 2C, a cluster 11 constituted by a plurality of organic particles 10 also is attached to the first surface 1a. At least a part of the cluster 11 is embedded in the green sheet 1. When the cluster 11 is embedded in the green sheet 1, the surface area of the ceramic sheet described later can be improved satisfactorily. Additionally, in some organic particles 10, more than half parts thereof may be embedded in the green sheet 1. A part of each of the organic particles 10 may be exposed from the green sheet 1 from the viewpoint of removing the organic particles 10 later. The burial degrees of the organic particles 10 to the green sheet 1 may be different from each other. For example, the burial degrees of two organic particles 10 having the same size (particle size) may also be different from each other (refer to FIG. 2A).

Figure 3:
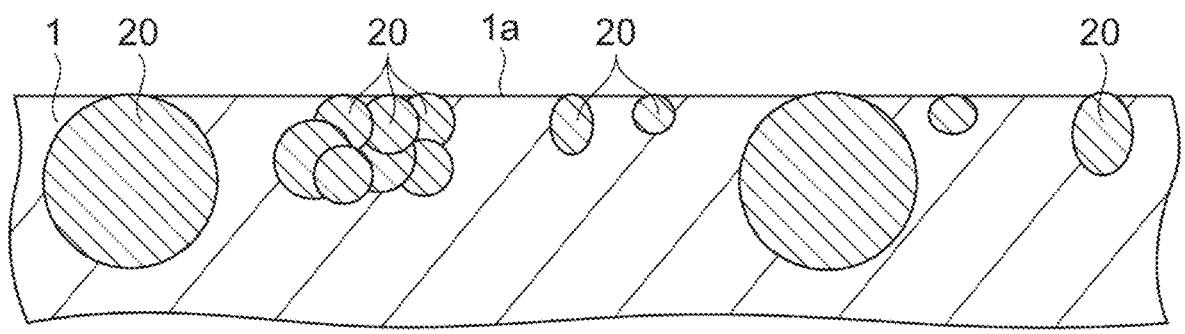
FIG. 3 is an outline enlarged end view showing a state in which particles are attached to a green sheet according to a second embodiment.

Next, an example of the structure of a green sheet manufactured by the manufacturing method in the second embodiment will be described while FIG. 3 is referred to. FIG. 3 is an outline enlarged end view showing a state in which particles are attached to a green sheet according to the second embodiment. As shown in FIG. 3, a plurality of particles 20 is attached to a green sheet 1. The plurality of particles 20 may contain comparatively small particles and comparatively large particles in the same way as the first embodiment. The plurality of particles 20 are disposed irregularly in the green sheet 1. In the second embodiment, most of each particle 20 is embedded in a first surface 1*a* of the green sheet 1. In the second embodiment, parts other than parts which was in contact with a substrate film (not shown) are covered with the green sheet 1 in the plurality of particles 20. For this reason, also in a second embodiment, most of each particle 20 is covered with the green sheet 1, and a part of each particle 20 is exposed from the green sheet 1.

<Ceramic Sheet>

A ceramic sheet of an embodiment has a plurality of particle marks on at least one surface, the average width of the particle marks is 0.2 to 50 μm, and the average depth is 0.1 to 25 μm. The ceramic sheet of the present embodiment may have particle marks derived from particles (organic particles) having an average particle size of 0.1 to 50 μm on at least one surface.

These ceramic sheets can be manufactured by a method for manufacturing a ceramic sheet, for example, of the above-mentioned first embodiment or second embodiment. Particle marks having suitable sizes are formed according to such ceramic sheets, and thus even though a stacked body into which green sheets are piled directly and formed is fired, sheets can be separated comparatively easily after firing.

Particle marks in the ceramic sheet may have a circular shape of the particle marks in the case of seeing from the sheet thickness direction, and the insides may be curved surfaces. Such particle marks can be formed using spherical particles in the method for manufacturing the above-mentioned ceramic sheet. Even though spherical particles are used in the case where the average particle size of the particles is small, for example, less than 1.5 μm, the shapes of particle marks may not be circular, and the insides of particle marks may not be curved surfaces. Even in this case, the requirements that the average width of particle marks in a ceramic sheet is 0.2 to 50 μm, and the average depth is 0.1 to 25 μm are satisfied.

Although the widths of particle marks in a ceramic sheet, for example, correspond to the maximum widths of the particle marks seen from the sheet thickness direction, it is not limited to this. The widths and the depths of particle marks are measured, for example, using a laser microscope. For example, an image of a predetermined region is first photographed using a super-depth color 3D shape measuring microscope or the like for all the particle marks existing in the predetermined region on the surface of a ceramic sheet. Next, the image is subjected to shape analysis, and the shape profile data of the particle marks in the above-mentioned predetermined region are created. Next, the widths and the depths of the particle marks are calculated using the shape profile data. The average width and the average depth of the particle marks are calculated from these calculation results. The widths of the particle marks are recognized as circle-equivalent diameters from the viewpoints of an increase in the efficiency of calculation, and the like. The above-mentioned predetermined region may be a region including the center of the ceramic sheet.

A specific example of a method for measuring the widths and the depths of particle marks will be described hereinafter. First, the surface image of a ceramic sheet (corresponding to the X- and Y-axes) photographed under the above-mentioned microscope or the like and the shape profile data of particle marks (corresponding to the Z-axis) are superimposed with a line passing through the centers of a plurality of particle marks considered as a baseline. A plane passing through intersection points of the outermost circumference contour part of a particle mark in a photographed image with the above-mentioned shape profile data is set as a basal surface. The basal surface shape of the particle mark is identified from the shape of the outermost circumference contour of the particle mark in the basal surface. As to a particle mark whose basal surface shape can be identified with a circle, the width of the particle mark is defined as the distance between two intersection points of the outermost circumference contour with the above-mentioned shape profile data. As to a particle mark whose basal surface shape cannot be identified with a circle, its area is first measured or calculated to determine the width of the particle mark. A radius when it is assumed that the area is a circle is calculated. The length obtained by doubling this radius is defined as the width of the particle mark whose basal surface shape cannot be identified with a circle. Meanwhile, the depth of the particle mark is defined as the normal line distance from the above-mentioned baseline to the lowest point in the above-mentioned shape profile data.

Figure 4A:
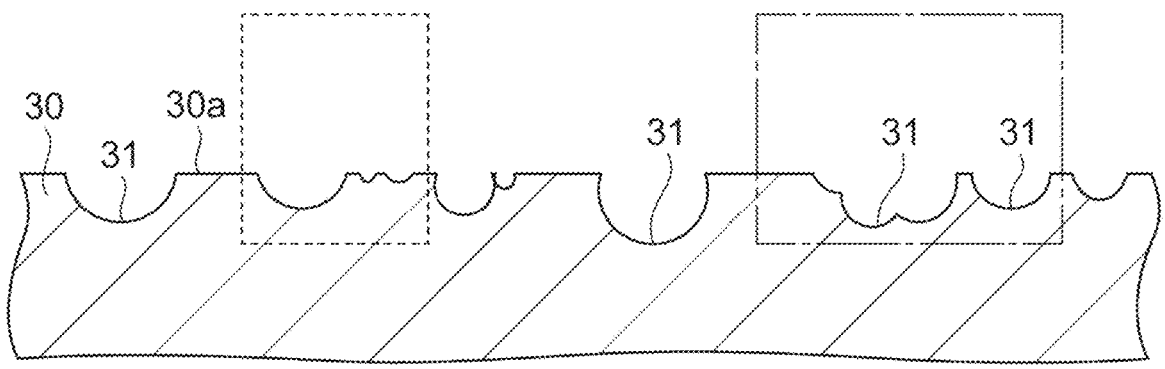
FIG. 4A is an outline enlarged end view showing a part of a ceramic sheet according to the first embodiment.
Figure 4B:
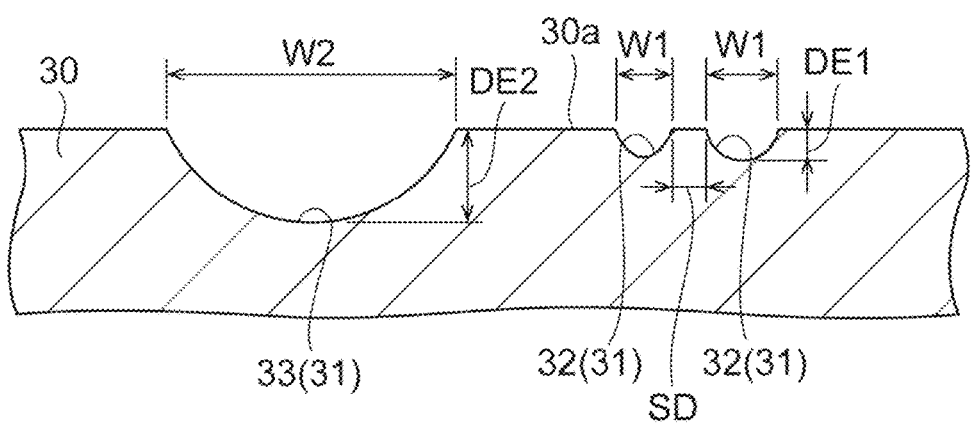
FIG. 4B is an enlarged view of a region shown with a dashed line in FIG. 4A.
Figure 4C:
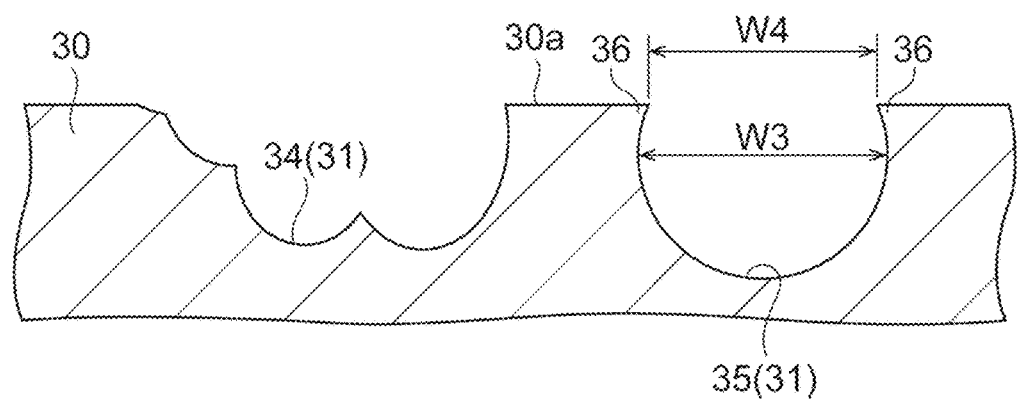
FIG. 4C is an enlarged view of a region shown with an alternate long and short dash line in FIG. 4A.

Next, the structure of the ceramic sheet manufactured by the manufacturing method in the first embodiment will be described with reference to FIGS. 4A to 4C. FIG. 4A is an outline enlarged end view showing a part of the ceramic sheet according to the first embodiment. FIG. 4B is an enlarged view of a region shown with a dashed line in FIG. 4A. FIG. 4C is an enlarged view of a region shown with an alternate long and short dash line in FIG. 4A. As shown in FIGS. 4A to 4C, a plurality of particle marks 31 are provided on the principal surface 30*a* of a ceramic sheet 30. The plurality of particle marks 31 are disposed irregularly, seen from the sheet thickness direction. When the ceramic sheet 30 is, for example, an electrolyte sheet for SOFC, a thin film such as an electrically conductive layer for an electrode can be formed on a principal surface 30*a*. Although the other principal surface is not shown, a plurality of particle marks may be provided also on the other principal surface located on the side opposite to the principal surface 30*a* in the sheet thickness direction, or particle marks may not be provided on the other principal surface.

A plurality of types of particle marks are included in the plurality of particle marks 31. For example, as shown in FIG. 4B, the plurality of particle marks 31 include marks 32 having comparatively small widths W1 and a mark 33 having a comparatively large width W2. Each of the marks 32 and 33 is recesses formed using single organic particles 10 as molds (refer to FIG. 2B). Although the shapes of the marks 32 and 33 are circular, seen from the sheet thickness direction, and the insides of the marks 32 and 33 are curved surfaces, it is not limited to this. The shortest distance SD between the marks 32 and 32 adjacent to each other in FIG. 4B is, for example, less than 0.1 μm. The widths of marks 32 and 33 broaden gradually from the bottom thereof to the principal surface 30*a* in the sheet thickness direction. The widths W1 of the marks 32 are, for example, 1.5 to 3 μm, and the width W2 of the mark 33 is, for example, 7 to 12 μm. Each of the widths W1 and W2 of the marks 32 and 33 are equivalent to the widths (maximum widths) in the principal surface 30*a*. In the sheet thickness direction, the depths DE1 of the marks 32 are, for example, 0.05 to 0.4 μm, and the depth DE2 of the mark 33 is, for example, 0.8 to 6 μm.

Although the marks 32 and 32 adjacent to each other in FIG. 4B are separate from each other, the marks 32 and 32 may be in contact with each other, or may overlap with each other. That is, the shortest distance between the particle marks 31 adjacent to each other may be 0. Although there is not shown, the three or more particle marks 31 (namely, some of the plurality of particle marks 31) may overlap with each other, or may be in contact with each other. In other words, a composite mark may be formed by making a few or many marks included in the plurality of particle marks 31 overlap with each other or be in contact with each other. The inside of this composite mark may be provided with a depression and a projection.

For example, as shown in FIG. 4C, the plurality of particle marks 31 have marks 34 and 35 having different shapes from the marks 32 and 33. The mark 34 is a recess formed using a cluster 11 constituted by a plurality of organic particles 10 as a mold, and is a type of composite mark (refer to FIG. 2C). At least a part of the inside of the mark 34 is provided with depressions and projections corresponding to the surfaces of a plurality of organic particles 10. For this reason, both the marks 32 and 33 having insides which are curved surfaces and the mark 34 having an inside provided with depressions and projections are provided on the principal surface 30a of the ceramic sheet 30.

The mark 35 is a recess formed using a spherical particle wherein more than half thereof is embedded in the green sheet 1 among the plurality of organic particles 10 as a mold (refer to FIG. 2C). An eave 36 is formed at the opening of the mark 35 depending on the portion forming the marks 35 in the ceramic sheet 30. The inside of the mark 35 is a curved surface in the same way as the insides of the marks 32 and 33. For this reason, the sectional shape of the mark 35 is closer to a circular shape than a semicircular shape. Therefore, the width of the mark 35 broadens gradually from the bottom to the principal surface 30a, and narrows gradually from halfway in the sheet thickness direction. That is, differently from the marks 32 and 33, the maximum width of the mark 35 is located closer to the bottom side of the mark 35 than to the principal surface 30a in the sheet thickness direction. In other words, the maximum width of the mark 35 is located between the principal surface 30a and the bottom of the mark 35 in the sheet thickness direction. For example, the maximum width W3 of the mark 35 is 1.05 to 3 times the width W4 of the mark 35 in the principal surface 30a. For example, when the mark 35 is spherical and the maximum width W3 is 1.1 times the width W4, the mark 35 is formed using an organic particle 10 half or more (around 65%) of which was embedded in the green sheet 1 as a mold. When the mark 35 is spherical and the maximum width W3 is 3 times the width W4, the mark 35 is formed using an organic particle 10 almost all (around 97%) of which was embedded in the green sheet 1 as a mold. Although the mark 35 is formed based on a single organic particle in the same way as the marks 32 and 33, it is not limited to this.

The average width of the plurality of particle marks 31 having the above-mentioned marks 32 to 35 is, for example, 0.2 to 50 µm. Additionally, the coefficient of variation (Cv value) of the width of the plurality of particle marks 31 is, for example, 0.23 or more. The lower limit value of the coefficient of variation may be 0.25, may be 0.26, may be 0.3 or may be 0.35. The upper limit value of the coefficient of variation of the width of the plurality of particle marks 31 is not particularly limited, and the upper limit value may be, for example, 2 or 1. The average depth of the plurality of particle marks 31 is, for example, 0.1 to 25 µm. Additionally, the coefficient of variation of the depth of the plurality of particle marks 31 is, for example, 0.25 or more. The lower limit value of the coefficient of variation may be 0.26, may be 0.3, may be 0.35, may be 0.4, may be 0.5, may be 0.55, or may be 0.6. The upper limit value of the coefficient of variation of the depth of the plurality of particle marks 31 is not particularly limited, and the upper limit value may be, for example, 2 or 1.

The coefficient of variation of the width of the plurality of particle marks 31 corresponds to a value obtained by dividing the standard deviation of the width by the average width (standard deviation of width/average width). Similarly, the coefficient of variation of the depth of the plurality of particle marks 31 corresponds to a value obtained by dividing the standard deviation of the depth by the average depth (standard deviation of depth/average depth). Each of the standard deviation of the width of the plurality of particle marks 31 and the standard deviation of the depth of the plurality of particle marks 31 can be calculated by the following expression. In the following expression, σ shows the standard deviation, x shows the width or the depth of each particle mark, $x_{ave}$ show the average width or the average depth, and n shows the measured number of particle marks.

$$\sigma = \sqrt{\frac{1}{(n-1)} \times \left\{ \sum_{i=1}^{n} (x_i - x_{ave})^2 \right\}} \qquad \text{[Expression 1]}$$

A reason why a ceramic sheet 30 may not be able to be manufactured when a different manufacturing method from the manufacturing method in the first embodiment is adopted will be described below. Examples of the different manufacturing method from the manufacturing method in the first embodiment include a manufacturing method using a mold such as a stamper (hereafter defined as Comparative Manufacturing Method). In the above-mentioned Comparative Manufacturing Method, since a mold is generally provided with regular recesses and projections, regular recesses are provided on the surface of a ceramic sheet. That is, in the above-mentioned Comparative Manufacturing Method using a mold such as a stamper, a plurality of recesses exhibiting the same shape and the same size are provided on the surface of a ceramic sheet. In this case, the coefficient of variation of the width of the recesses tends to be set as a small value, and, for example, the coefficient of variation can be less than 0.10.

Meanwhile, when a plurality of ceramic sheets 30 are manufactured using organic particles 10 like the first embodiment, the coefficient of variation of the width of a plurality of particle marks 31 provided on the principal surfaces 30a of the ceramic sheets 30 is 0.23 or more, which is a value which cannot usually be obtained when a stamper or the like is used. Therefore, a ceramic sheet 30 wherein the coefficient of variation of the width of the plurality of particle marks 31 is in the above-mentioned range cannot be obtained by the above-mentioned Comparative Manufacturing Method, on the other hand, can be obtained by implementing the manufacturing method according to the first embodiment.

Next, the operation and effect of the ceramic sheet 30 manufactured by the manufacturing method according to the first embodiment will be described in comparison with the ceramic sheet manufactured with the above-mentioned Comparative Manufacturing Method.

As mentioned above, a plurality of recesses exhibiting the same shape and the same size are provided on the surfaces of the ceramic sheets manufactured by the above-mentioned Comparative Manufacturing Method. Such ceramic sheets may be very fragile against force along a specific direction. Meanwhile, the coefficient of variation of the width of the plurality of particle marks 31 provided on the principal surface 30a of the ceramic sheet 30 according to the first embodiment is 0.23 or more. For this reason, for example, a plurality of particle marks 31 including marks 32 and 33 and the like having widths greatly different from each other are Ruined on the principal surface 30a of the ceramic sheet 30. The ceramic sheet 30 can be prevented from being fragile against force along a specific direction thereby. Additionally, as mentioned above, very simple treatment of attaching organic particles to the surface of green sheets is adopted in the first embodiment. Therefore, a ceramic sheet 30 wherein the manufacturing process can be simplified, the cost can be reduced, and the ceramic sheet has enough flexural strength can also be provided in the first embodiment.

In the above-mentioned Comparative Manufacturing Method, a mold having a surface having fine recesses and projections obtained by elaborate processing is necessary to provide uniform and fine recesses on ceramic sheets. For this reason, cost which it takes to manufacture the mold is high. In addition, the surface of the mold is smoothed by use depending on the material of the mold. For this reason, when ceramic sheets are mass-produced by the above-mentioned Comparative Manufacturing Method, the molds need to be replaced periodically. Therefore, the above-mentioned Comparative Manufacturing Method tends to be more costly than the manufacturing method according to the first embodiment. The cost of the mass production of ceramic sheets can be reduced by implementing the manufacturing method according to the first embodiment also from such a viewpoint.

According to the first embodiment, the insides of marks 32 and 33 are curved surfaces, and the inside of a mark 34 is provided with depressions and projections. In this case, the ceramic sheet 30 can be satisfactorily prevented from being fragile against force along a specific direction.

According to the first embodiment, the maximum width of the mark 35 is located closer to the bottom side of the mark 35 than to the principal surface 30a in a sheet thickness direction. In this case, an eave 36 is formed at the opening of the mark 35 depending on the portion forming the marks 35 in the ceramic sheet 30. When a thin film such as an electrically conductive layer is formed on the principal surface 30a of the ceramic sheet 30, the mark 35 is filled with a material constituting the thin film. In this case, since an anchor effect is exhibited by the cave 36 formed at the opening of the mark 35, it is difficult for the above-mentioned thin film to exfoliate from the principal surface 30a of the ceramic sheet 30.

Even if the structure equivalent to the above-mentioned eave is formed at the time of forming recesses on a ceramic sheet, for example using the above-mentioned mold of Comparative Manufacturing Method, the above-mentioned structure collapses at the time of separating the above-mentioned mold from the ceramic sheet. Therefore, when the above-mentioned Comparative Manufacturing Method is adopted, it can be said that an eave cannot be formed on the opening of a recess. For example, when particle marks are formed in a ceramic sheet using inorganic particles which are not removed by firing, the structure corresponding to the above-mentioned eave collapse at the time of removing the inorganic particles compulsorily by washing or the like. Meanwhile, organic particles 10 can be removed without collapsing a portion formed as the eave 36 when the organic particles 10 are used like the first embodiment. Therefore, it can be said that it is not until the manufacturing method according to the first embodiment is applied that the eave 36 formed at the mark 35 can remain on the ceramic sheet 30.

In the first embodiment, some of the plurality of particle marks 31 may overlap with each other, or may be in contact with each other. When a plurality of recesses is formed on the surface of the ceramic sheet by the above-mentioned Comparative Manufacturing Method, the plurality of recesses is separated from each other. That is, the ceramic sheet 30 which can have some particle marks which overlap with each other or be in contact with each other among the plurality of particle marks 31 is obtained by implementing the manufacturing method according the first embodiment.

In the first embodiment, the coefficient of variation of the depth of the plurality of particle marks 31 is 0.25 or more. Such a coefficient of variation cannot usually be obtained when a stamper or the like is used like the above-mentioned Comparative Manufacturing Method. That is, the ceramic sheet 30 wherein the coefficient of variation of the depth of the plurality of particle marks 31 is in the above-mentioned range is obtained by implementing the manufacturing method according to the first embodiment.

In the first embodiment, the depth DE1 of the mark 32 included in the plurality of particle marks 31 is 0.05 μm or more and 0.4 μm or less, and the depth DE2 of the mark 33 included in the plurality of the particle mark 31 is 0.8 μm or more and 6 μm or less. Thus, the plurality of particle marks 31 having the marks 32 and 33 having depths which are greatly different from each other cannot usually be obtained when a stamper or the like is used like the above-mentioned Comparative Manufacturing Method. That is, the ceramic sheet 30 on which the plurality of particle marks 31 having the marks 32 and 33 are provided is obtained by implementing the manufacturing method according to the first embodiment.

Figure 5:
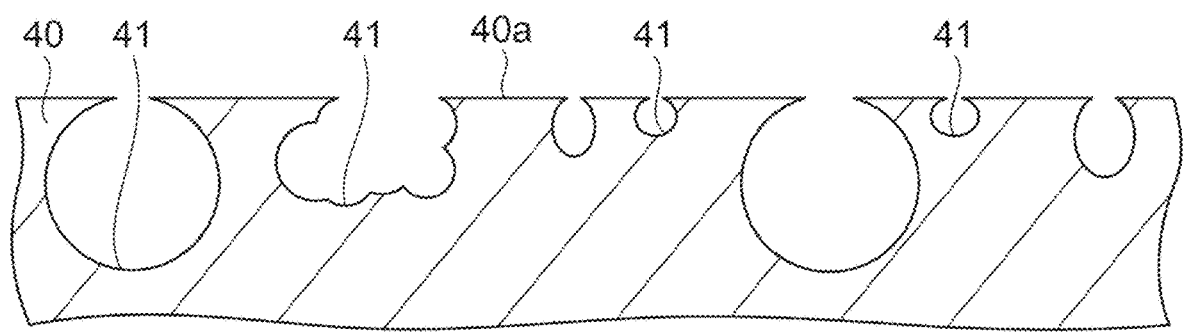
FIG. 5 is an outline enlarged end view showing a part of a ceramic sheet according to a second embodiment.

Next, the structure of a ceramic sheet manufactured by the manufacturing method in the second embodiment will be described with reference to FIG. 5. FIG. 5 is an outline enlarged end view showing a part of a ceramic sheet according to the second embodiment. As shown in FIG. 5, a plurality of particle marks 41 are provided on a principal surface 40a of a ceramic sheet 40. The plurality of particle marks 41 are disposed irregularly in the same way as the first embodiment, seen from the sheet thickness direction. In the second embodiment, although the maximum width of most particle marks 41 (namely, all or almost all of the particle marks 41) are located closer to the bottom side of the particle marks 41 than to the principal surface 40a in the sheet thickness direction, it is not limited to this. The coefficients of variation of the widths and the depths of the plurality of particle marks 41 are in the same ranges as the first embodiment, respectively.

Also in such a second embodiment, the same operation and effect as the first embodiment are produced. In addition, eaves are formed at most portions which form particle marks 41 in the second embodiment. For this reason, for example, when a thin film such as an electrically conductive layer is formed on the principal surface 40a, it is more difficult for the thin film to exfoliate from the principal surface 40a of the ceramic sheet 40.

EXAMPLE

Although the present disclosure will be described in more detail by giving Examples, the present disclosure is not limited to only these Examples.

Example 1

(Preparation of Organic Particle Paste of First Example)

First, 8.2 g of ethyl cellulose (around 49% ethoxy) 10 (manufactured by Wako Pure Chemical Industries, Ltd.) was dissolved in 73.8 g of α-terpineol (manufactured by KANTO CHEMICAL CO., INC.) to prepare a binder solution for a paste. To 82 g of the obtained binder solution was added 40 g of EPOSTAR MA1002 (manufactured by NIPPON SHOKUBAI CO., LTD., average particle size 2 μm) as organic particles, and the mixture was mixed with a spatula to obtain the organic particle paste of a first example.

(Manufacturing of Green Sheet of First Example)

As a raw material powder, stabilized zirconia powder solid-dissolving 10 mol % scandium oxide and 1 mol % cerium oxide (manufactured by DAIICHI KIGENSO KAGAKU KOGYO CO., LTD., trade names "10Sc1CeSZ", d50; around 0.5 μm) was used. 100 parts by mass of this raw material powder, 18 parts by mass of a binder consisting of a methacrylic copolymer (number average molecular weight; 100000, glass transition temperature; 0° C.) in terms of the solid content, 2 parts by mass of a commercial polycarboxylic acid ester polymer dispersant as a dispersant, 3 parts by mass of dibutylphthalate as a plasticizer, and 50 parts by mass of a mixed solvent of toluene/ethyl acetate (mass ratio=1/1) as a solvent were supplied with a nylon mill charged with zirconia balls, and the mixture was milled for 40 hours to prepare a slurry. The obtained slurry was poured to a round-bottomed cylindrical vacuum degassing container having a jacket and provided with an anchor-shaped stirrer. Then, the obtained slurry was concentrated and degassed at reduced pressure at a jacket temperature of 40° C. while the stirrer was rotated at a speed of 30 rpm, to prepare a raw material slurry for coating whose viscosity at 25° C. was adjusted to 3 Pa·s. This raw material slurry was continuously applied to a PET film as a substrate film in a coating device by a doctor blade method. In the same coating device, a coating film on the PET film was dried at 100° C. for around 1 hour to obtain a long green sheet for solid electrolytes having a thickness of around 0.25 mm. This long green sheet was exfoliated from the PET film and then cut using a metallic mold to obtain a substantially square green sheet with one side around 160 mm. The thus obtained green sheet is used as a green sheet of the first example. In the green sheet, a surface which was in contact with the PET film which is a substrate film, that is, a first surface of the green sheet, may be described as a "PET surface", and a surface which is on the side opposite to the PET surface and was not in contact with the substrate film, that is, a second surface of the green sheet, may be described as a "Air surface" hereafter.

(Printing)

The organic particle paste of the first example was printed on the PET surface of the green sheet of the first example using a screen printer (manufactured by Newlong Machine Works, Ltd.: LS-150 type) and a lithographic plate (screen mesh: made of Tetoron, #500) having a substantially square pattern with one side around 155 mm, and air-dried. A printed substantially square green sheet with one side around 150 mm was cut from this printed surface of the green sheet using a Thomson blade. Ten printed substantially square green sheets with one side around 150 mm were obtained by the same work.

(Firing)

While commercial cornstarch for foods was sprinkled on the PET surfaces of the ten printed substantially square green sheets with one side around 150 mm, and spread almost uniformly with a brush, the green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ten piled ceramic sheets (zirconia sheets). The results obtained by evaluating the ease of separating at the time of separating the ten piled sheets one by one, the scattering and diffusion of powder, and the surface roughness Ra and the flexural strength of the sheets after separation are shown in Table 1.

Figure 6A:
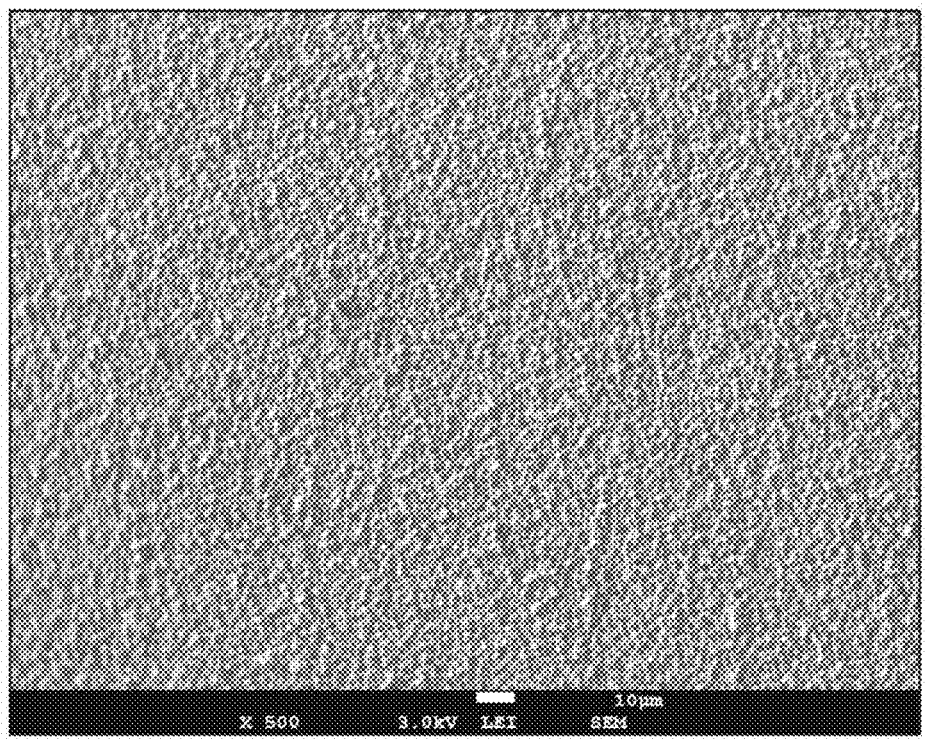
FIGS. 6A and 6B are SEM images showing parts of a ceramic sheet.
Figure 6B:
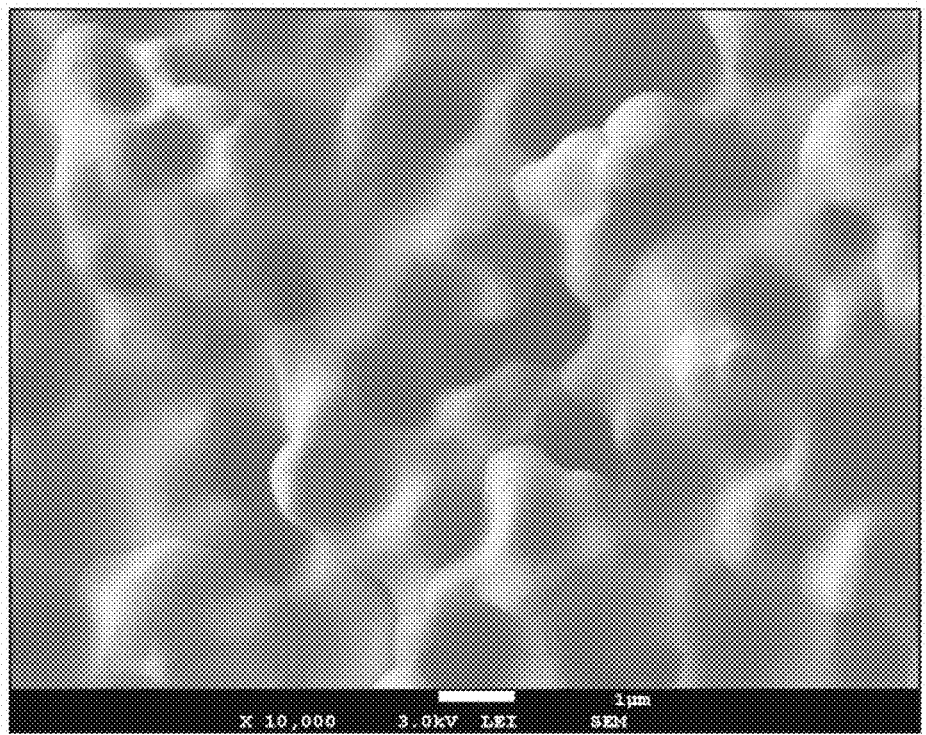
Figure 7A:
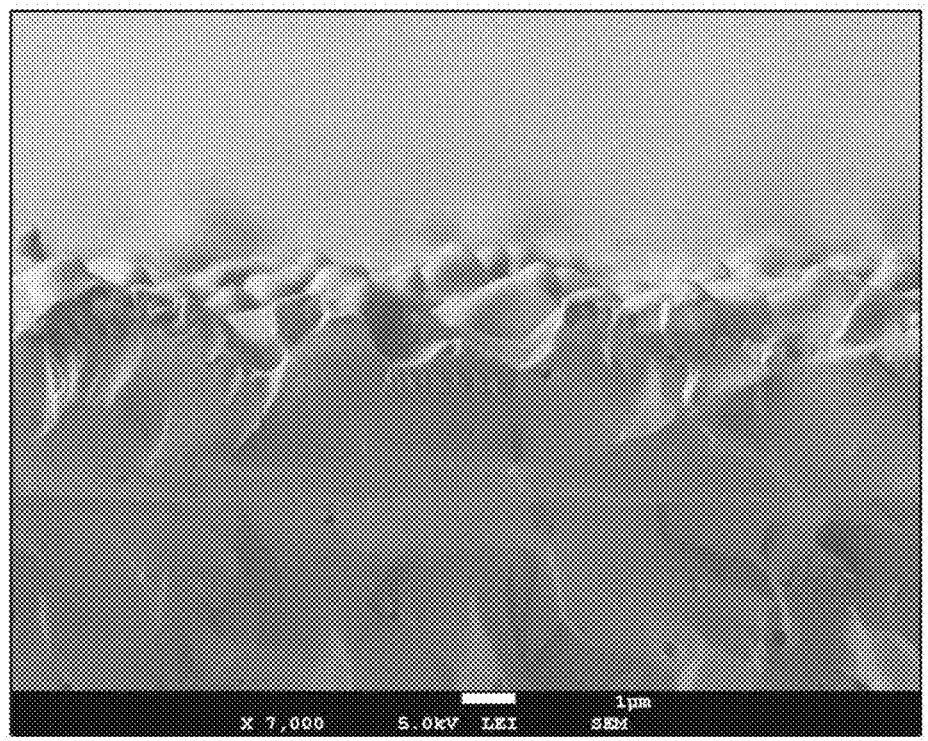
FIGS. 7A and 7B are sectional SEM images showing parts of a ceramic sheet.
Figure 7B:
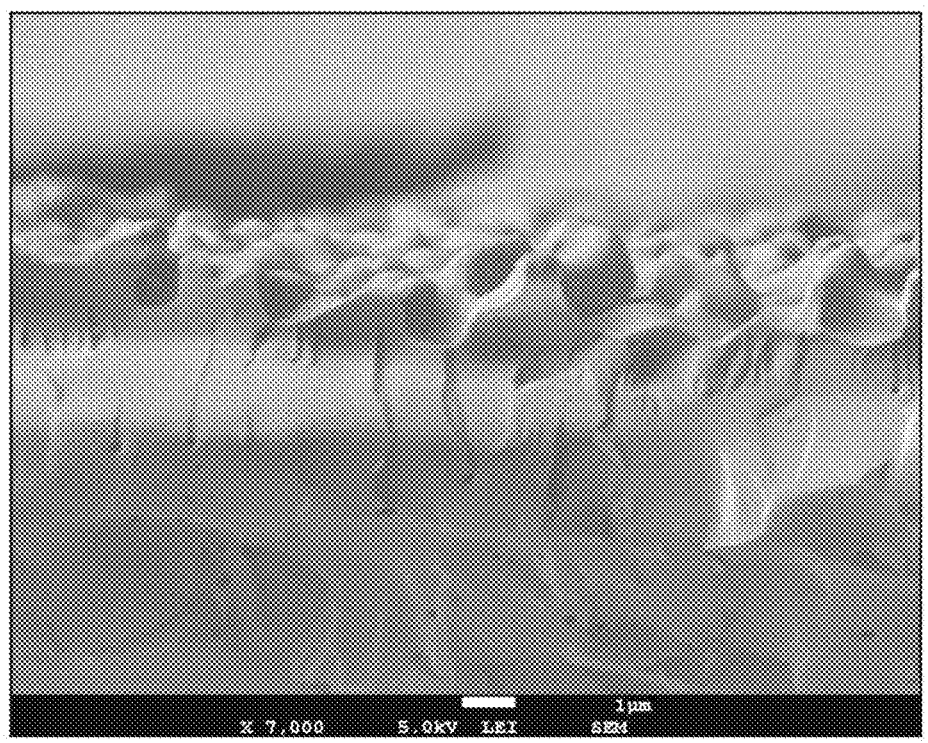

FIGS. 6A and 6B are SEM images showing parts of a ceramic sheet. FIGS. 7A and 7B are sectional SEM images showing parts of a ceramic sheet. As shown in FIGS. 6A and 6B and FIGS. 7A and 7B, a plurality of types of particle marks disposed irregularly are provided on a principal surface of the ceramic sheet. As shown in FIG. 6B and FIG. 7A, it is confirmed that particle marks supposed to have been formed by clusters of organic particles were provided on the principal surface of the ceramic sheet, and depressions and projections were provided on the surface of the particle marks. As shown in FIG. 7B, the maximum widths of some particle marks are located closer to the bottom side thereof than to the principal surface in the sheet direction. It is confirmed that eaves formed by particle marks were provided on the left and right of FIG. 7B.

Example 2

(Preparation of Organic Particle Paste of Second Example)

The organic particle paste of a second example was obtained in the same way as in Example 1 except that EPOSTAR MA1010 (NIPPON SHOKUBAI CO., LTD. average particle size 10 μm) was used as organic particles.

(Manufacturing of Green Sheet of Second Example)

As a raw material powder, stabilized zirconia powder solid-dissolving 10 mol % scandium oxide and 1 mol % cerium oxide (produced DAIICHI KIGENSO KAGAKU KOGYO CO., LTD., trade names "10Sc1CeSZ", d50; around 0.5 μm) was used. 100 parts by mass of this raw material powder, 117 parts of the below-mentioned binder solution, 3 parts by mass of a commercial polycarboxylic acid ester polymer dispersant as a dispersant, and 6 parts by mass of dibutylphthalate as a plasticizer are supplied with a nylon mill charged with zirconia balls, and the mixture was milled for 40 hours to prepare a slurry. The obtained slurry was poured to a round-bottomed cylindrical vacuum degassing container having a jacket and provided with an anchor-shaped stirrer. Then, the obtained slurry was concentrated and degassed at reduced pressure at a jacket temperature of 40° C. while the stirrer was rotated at a speed of 30 rpm to prepare a raw material slurry for coating whose viscosity at 25° C. was adjusted to 2 Pa·s. This raw material slurry was continuously applied to a PET film as a substrate film in a coating device. In the same coating device, a coating film on the PET film was dried at 100° C. for around 1 hour to obtain a long green sheet for solid electrolytes having a thickness of around 0.2 mm. This long green sheet was exfoliated from the PET film and then cut using a metallic mold to obtain a substantially square green sheet with one side around 160 mm. The thus obtained green sheet is used as a green sheet of the second example. While a mixed solution constituted of 40 parts by mass of toluene and 60 parts by mass of 2-butanone was stirred at room temperature, 17 parts by mass of a polyvinyl butyral-based resin (BL1 manufactured by SEKISUI CHEMICAL CO., LTD.) was gradually added to this mixed solution to prepare the above-mentioned binder solution.

(Printing)

The organic particle paste of the second example was printed on the Air surface of the green sheet of the second example using a screen printer (manufactured by Newlong Machine Works, Ltd.: LS-150 type) and a lithographic plate (screen mesh: made of Tetoron, #500) having a substantially square pattern with one side around 155 mm, and dried at 80° C. for 1 hour in a hot air circulating drier. A printed substantially square green sheet with one side around 150 mm was cut from this printed surface of the green sheet using a Thomson blade. Ten printed substantially square green sheets with one side around 150 mm were obtained by the same work.

Figure 8:
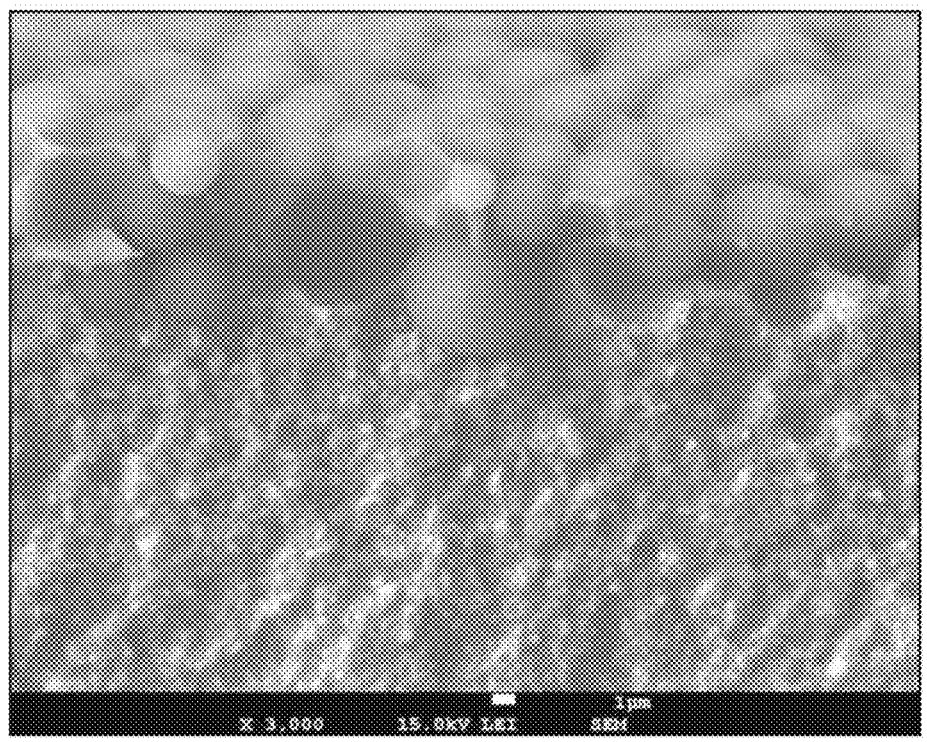
FIG. 8 is a sectional SEM image showing a part of a printed green sheet.

FIG. 8 is a sectional SEM image showing a part of a printed green sheet. As shown in FIG. 8, it is confirmed that organic particles having a plurality of sizes are attached to the surface of the green sheet of the second example. It is confirmed that clusters of some organic particles are also attached on the surface of the green sheet.

(Firing)

While commercial cornstarch for foods was sprinkled on the PET surfaces of the ten printed substantially square green sheets with one side around 150 mm, and spread almost uniformly with a brush, the green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ten piled ceramic sheets. The results obtained by evaluating the ease of separating at the time of separating the ten piled sheets one by one, the scattering and diffusion of powder, and the surface roughness Ra and the flexural strength of the sheets after separation are shown in Table 1.

Example 3

Ten piled ceramic sheets were obtained in the same way as in Example 2 except that the amount of EPOSTAR MA1010 used as organic particles was 10 g. The results obtained by evaluating the ease of separating at the time of separating the ten piled sheets one by one, the scattering and diffusion of powder, and the surface roughness Ra and the flexural strength of the sheets after separation are shown in Table 1.

Example 4

(Preparation of Organic Particle Paste of Fourth Example)

First, 8.2 g of ethyl cellulose (around 49% ethoxy) 10 (manufactured by Wako Pure Chemical Industries, Ltd.) was dissolved in 73.8 g of α-terpineol (manufactured by KANTO CHEMICAL CO., INC.) to prepare a binder solution for a paste. To 82 g of the obtained binder solution was added 40 g of EPOSTAR MA1010 (NIPPON SHOKUBAI CO., LTD. average particle size 10 μm) as organic particles, and the mixture was mixed with a spatula to obtain the organic particle paste of a fourth example.

(Printing on PET Film)

The organic particle paste of the fourth example was printed on the upper surface of a PET film having a width of 160 mm by feeding the PET film every time printing was performed using a screen printer (manufactured by Newlong Machine Works, Ltd.: LS-150 type) and a lithographic plate (screen mesh: made of Tetoron, #500) having a substantially square pattern with one side around 155 mm, and then dried through a hot air chamber at 80° C.

(Manufacturing of Green Sheet)

As a raw material powder, stabilized zirconia powder solid-dissolving 10 mol % scandium oxide and 1 mol % cerium oxide (produced DAIICHI KIGENSO KAGAKU KOGYO CO., LTD., trade names "10Sc1CeSZ", d50; around 0.5 μm) was used. 100 parts by mass of this raw material powder, 18 parts by mass of a binder consisting of a methacrylic copolymer in terms of the solid content (number average molecular weight; 100000, glass transition temperature; 0° C.), 2 parts by mass of a commercial polycarboxylic acid ester polymer dispersant as a dispersant, 3 parts by mass of dibutylphthalate as a plasticizer, and 50 parts by mass of a mixed solvent of toluene/ethyl acetate (mass ratio=1/1) as a solvent were supplied with a nylon mill charged with the zirconia ball, and the mixture was milled for 40 hours to prepare a slurry. The obtained slurry was poured to a round-bottomed cylindrical vacuum degassing container having a jacket and provided with an anchor-shaped stirrer. Then, the obtained slurry was concentrated and degassed at reduced pressure at a jacket temperature of 40° C. while the stirrer was rotated at a speed of 30 rpm to prepare a raw material slurry for coating whose viscosity at 25° C. was adjusted to 3 Pa·s. This raw material slurry was continuously applied to the above-obtained PET film on which the organic particle paste was printed in a coating device. In the same coating device, a coating film on the PET film was dried at 100° C. for around 1 hour to obtain a long green sheet for solid electrolytes having a thickness of around 0.2 mm. This long green sheet is exfoliated from the PET film to obtain a green sheet wherein organic particles are embedded on the PET surface side, or the green sheet has recesses in the shapes of organic particles. Ten substantially square green sheets with one side around 150 mm were cut from such a green sheet wherein organic particles are embedded on the PET surface side, or the green sheet has recesses in the shapes of organic particles using a metallic mold.

(Firing)

While commercial cornstarch for foods was sprinkled on the PET surfaces of the ten printed substantially square green sheets with one side around 150 mm, and spread almost uniformly with a brush, the green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ten piled ceramic sheets. The results obtained by evaluating the ease of separating at the time of separating the ten piled sheets one by one, the scattering and diffusion of powder, and the surface roughness Ra and the flexural strength of the sheets after separation are shown in Table 1.

Example 5

Ten piled ceramic sheets were obtained in the same way as in Example 1 except that acrylic particles (MX-80H3wT manufactured by Soken Chemical & Engineering Co., Ltd., average particle size of 0.8 μm) were used as the organic particles. The results obtained by evaluating the ease of separating at the time of separating the ten piled sheets one by one, the scattering and diffusion of powder, and the surface roughness Ra and the flexural strength of the sheets after separation are shown in Table 1.

Comparative Example 1

The ten green sheets of the first example were provided. While commercial cornstarch for foods was sprinkled on the PET surfaces of these ten green sheets, and spread almost uniformly with a brush, the green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ceramic sheets. The results obtained by evaluating the ease of separating, the scattering and diffusion of powder, the surface roughness Ra and the flexural strength are shown in Table 2 as to the ten piled ceramic sheets.

Comparative Example 2

Ten green sheets of the second example were provided. One green sheet was taken so that the Air surface of the green sheet is down, around 0.2 g of alumina powder ("AL15-2" manufactured by Showa Denko K.K.) was dropped thereon and applied almost uniformly with a brush. That is, alumina powder was applied to the PET surface of the green sheet. The remaining nine sheets were subjected to the same treatment. These ten green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ceramic sheets. The results obtained by evaluating the ease of separating, the scattering and diffusion of powder, and the surface roughness Ra and the flexural strength are shown in Table 2 as to the ten piled ceramic sheets.

Comparative Example 3

(Roughening Treatment of PET Film)

The same PET film provided as a substrate film in Example 1 was cut into a substantially square with one side around 160 mm. The surface of this film was sandblast-treated, water-washed and dried to obtain a surface wherein Ra=0.6

(Manufacturing of Green Sheet)

A green sheet was obtained in the same way as in Example 4 except that a film obtained by connecting ten films wherein the surfaces were sandblast-treated was used as the substrate film. This green sheet was cut into ten substantially square green sheets with one side around 150 mm using a metallic mold in the same way as Example 4.

(Firing)

Ten piled ceramic sheets were obtained by the same method as Example 4, and the results obtained by evaluating the ease of separating at the time of separating the ten piled sheets one by one, the scattering and diffusion of powder, and the surface roughness Ra and the flexural strength of the sheets after separation are shown in Table 2.

Comparative Example 4

First, a stamper wherein the pressing part and the substrate part were made of resin, and the surface of the pressing part was coated with fluororesin was provided. The pressing part is provided with a plurality of projections. The shape of each projection was hemispherical, the height of each projection was 15 μm, the diameter of each projection was 30 μm, and the intervals between adjacent projection peaks were 60 μm. The green sheet of the first example was cut with a metallic mold to provide ten substantially square green sheets (with one side around 120 mm). Then, a stacked body obtained by stacking one substantially square green sheet and a stamper sequentially was provided on a heating table (heating table/green sheet/stamper). Next, the stacked body was placed on the press part of a compression molding machine (manufactured by Sinto Metal Industries, Ltd., type "S-37.5"). Subsequently, the stacked body was pressurized under the conditions of a pressing temperature of 25° C., a pressing force of 22.5 MPa (230 kgf/cm$^2$) and a press time of 2 seconds. The stamper was exfoliated from the green sheet to obtain a green sheet on which depression holes were formed.

Ten green sheets on which depression holes were formed were provided by the above-mentioned technique. Then, while commercial cornstarch for foods was sprinkled on the PET surfaces, and spread almost uniformly with a brush, the green sheets were piled mutually to manufacture a stacked body so that the Air surfaces were down. An alumina porous plate having the same size (porosity around 70%, around 60 g) was placed on the stacked body, the stacked body were heated to 400° C. and degreased in a hot air circulating electric furnace, the temperature was then raised to 1350° C. in a high temperature box-shaped electric furnace, and the green sheets were fired to obtain ceramic sheets. The results obtained by evaluating the ease of separating are shown in Table 2 as to the ten piled ceramic sheets.

[Evaluation Method]

In Examples and Comparative Examples, the ease of separating, the scattering and the diffusion of powder, the surface roughness Ra, and the flexural strength were evaluated by the following methods.

(Ease of Separating)

Ten piled ceramic sheets after firing were separated by hand, and the ease of separating sheets (releasability) was evaluated according to the following five ranks.

A: Sheets do not adhere, and separate almost by itself.
B: Sheets do not adhere, and can be separated easily.
C: Sheets do not adhere, and can be separated by applying slight force.
D: There is points at which sheets adhere very slightly, and the sheets can be separated if the sheets are handled carefully.
E: Sheets adhere, and separation is difficult.

(Scattering and Diffusion of Powder)

After the evaluation of "the ease of separating", it was visually confirmed whether powder was scattered and diffused. When powder is scattered and diffused, the powder needs to be washed.

(Surface Roughness Ra)

As to ceramic sheets after firing, the surface roughnesses Ra of the surfaces equivalent to the PET surface and the Air surface of the corresponding green sheet were measured using a stylus surface roughness meter ("Surftest SJ-201" manufactured by Mitutoyo Corporation, standard: JIS B0601: 2001).

(Flexural Strength)

A rectangle having a width of 5 mm and a length of 30 mm was cut out of a ceramic sheet after firing with a high-speed diamond cutter and used as a measurement sample. As to this measurement sample, the four-point flexural strength was measured in accordance with HS R1601:1995. That is, the maximum stress causing breakage when the measurement sample was placed on two lower supports disposed at a span of 30 mm with the surface equivalent to the Air surface of a green sheet up, and a load was applied at a crosshead speed of 0.5 mm/min from two upper supports disposed at a span of 20 mm at room temperature was measured, and the flexural strength was calculated according to an expression of "the calculation of bending strength" described in the same JIS.

(Widths and Depths of Particle Marks in Ceramic Sheet)

The surface on which the particle marks remained in a ceramic sheet obtained in each Example was observed using a laser microscope (manufactured by KEYENCE CORPORATION, objective 150 times). The widths and the depths of particle marks in each Example were measured by this. The results are shown in Table 1. Although particle marks wherein the particle marks were circular, and the insides were curved surfaces were observed as to Examples 1 and 2, particle marks in Example 5 were groove-shaped.

In addition, the average width, the coefficient of variation of the widths, the average depth, and the coefficient of variation of the depths of the particle marks of Examples and Comparative Example 4 were calculated. These results are shown in Tables 1 and 2.

TABLE 1

|  | Example 1 | Example 2 | Example 3 | Example 4 | Example 5 |
|---|---|---|---|---|---|
| Ease of separating | B | C | D | B | A |
| Scattering and diffusion of powder | Not scattered or diffused | Not scattered or diffused | Not scattered or diffused | Not scattered or diffused | Not scattered or diffused |
| Surface roughness Ra PET surface/Air surface [μm] | 0.23/0.23 | 0.07/0.21 | 0.18/0.26 | 0.18/0.28 | 0.17/0.24 |
| Flexural strength [MPa] | 330 | 300 | 320 | 330 | 330 |
| Width of particle marks [μm] | 0.4-4 | 2-10 | 2-10 | 2-10 | 0.8-1.6 |
| Coefficient of variation of width of particle marks | 0.32 | 0.37 | 0.34 | 0.36 | 0.28 |
| Depth of particle marks [μm] | ~1.6 | ~3 | ~3 | ~3 | ~0.8 |
| Coefficient of variation of depth of particle marks | 0.47 | 0.62 | 0.54 | 0.58 | 0.39 |

TABLE 2

|  | Comparative Example 1 | Comparative Example 2 | Comparative Example 3 | Comparative Example 4 |
|---|---|---|---|---|
| Ease of separating | E | B | B | E |
| Scattering and diffusion of powder | Not scattered or diffused | Scattered and diffused | Not scattered or diffused | — |
| Surface roughness Ra PET surface/Air surface [μm] | 0.07/0.28 | 0.16/0.32 | 0.58/0.26 | — |
| Flexural strength [MPa] | 330[*1] | 300 | 120 | — |
| Width of particle marks [μm] | No recesses and projections are observed. | <0.1 | No particle marks are observed.[*2] | 18[*3] |
| Coefficient of variation of width of particle marks | — | — | — | 0.17[*3] |
| Depth of particle marks [μm] | No recesses and projections are observed. | <0.1 | No particle marks are observed.[*2] | 3.5[*3] |
| Coefficient of variation of depth of particle marks | — | — | — | 0.15[*3] |

[*1] The flexural strength of a ceramic sheet of Comparative Example 1 was measured as to a test piece obtained by selecting and cutting a separating part.
[*2] As to Comparative Example 3, although recesses and projections formed by sandblast treatment were observed, no particles were used, and thus no particle marks were observed.
[*3] The width of particle marks, the coefficient of variation thereof, the depth of particle marks and the coefficient of variation thereof of Comparative Example 4 were the diameter of dents and the coefficient of variation thereof and the depth of dents and the coefficient of variation thereof by a stamper, respectively.

As was clear from Table 1, according to the Examples 1 to 5, ceramic sheets having enough flexural strength could be obtained by a simple method without washing powder.

What is claimed is:

1. A ceramic sheet comprising:
a principal surface having particle marks,
wherein an average width of the particle marks is 0.2 to 50 µm, an average depth of the particle marks along a sheet thickness direction is 0.1 to 25 µm, and a coefficient of variation of widths of the particle marks is 0.23 or more, and
wherein the particle marks are only on the principal surface.

2. The ceramic sheet according to claim 1,
wherein an inside of a first particle mark in the particle marks is a curved surface, and a depression and a projection are located on at least a part of an inside of a second particle mark in the particle marks.

3. The ceramic sheet according to claim 1,
wherein a maximum width of at least one particle mark in the particle marks is located closer to a bottom side thereof than to the principal surface in the sheet thickness direction.

4. The ceramic sheet according to claim 1,
wherein some of the particle marks overlap with each other or are in contact with each other.

5. The ceramic sheet according to claim 1,
wherein a coefficient of variation of depths of the particle marks is 0.25 or more.

6. The ceramic sheet according to claim 1,
wherein depths of some particle marks in the particle marks are 0.05 to 0.4 µm, and depths of some other particle marks in the particle marks are 0.8 to 6 µm.

7. The ceramic sheet according to claim 1,
wherein a coefficient of variation of depths of the particle marks is 0.3 or more.

8. The ceramic sheet according to claim 1,
wherein the ceramic sheet is an electrolyte sheet of a solid oxide fuel cell.

9. The ceramic sheet according to claim 1,
wherein only one principal surface of the ceramic sheet has the particle marks.

10. The ceramic sheet according to claim 1,
wherein the particle marks are formed by organic particles.

11. The ceramic sheet according to claim 10,
wherein the organic particles include a poly(meth)acrylate resin.

12. The ceramic sheet according to claim 10,
wherein the organic particles have an average particle size of 1.5 µm to 10 µm.

13. The ceramic sheet according to claim 10,
wherein the organic particles exclude starch powders.

* * * * *